United States Patent
Ramachandran et al.

(10) Patent No.: US 12,314,826 B1
(45) Date of Patent: May 27, 2025

(54) SECONDARY CELL SELECTION

(71) Applicant: Nokia Solutions and Networks Oy, Espoo (FI)

(72) Inventors: Srilatha Ramachandran, Bangalore (IN); Afef Feki, Massy (FR); Shivanand Kadadi, Bangalore (IN); Claudiu Mihailescu, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/937,966

(22) Filed: Nov. 5, 2024

(51) Int. Cl.
*G06N 20/00* (2019.01)
*H04L 41/16* (2022.01)
*H04W 16/18* (2009.01)
*H04W 24/02* (2009.01)

(52) U.S. Cl.
CPC .......... *G06N 20/00* (2019.01); *H04W 24/02* (2013.01); *H04L 41/16* (2013.01); *H04W 16/18* (2013.01)

(58) Field of Classification Search
None
See application file for complete search history.

(56) References Cited

U.S. PATENT DOCUMENTS

| | | | |
|---|---|---|---|
| 10,673,546 B2 | 6/2020 | Bedekar | |
| 2020/0252142 A1* | 8/2020 | Bedekar | H04W 24/10 |
| 2023/0099006 A1 | 3/2023 | Popescu et al. | |

FOREIGN PATENT DOCUMENTS

| | | | |
|---|---|---|---|
| WO | WO-2017088499 A1 * | 6/2017 | |
| WO | 2022/113039 A1 | 6/2022 | |
| WO | 2022/139644 A1 | 6/2022 | |
| WO | WO-2024096704 A1 * | 5/2024 | |

OTHER PUBLICATIONS

"Msc-generator", Sourceforge, Retrieved on Nov. 1, 2024, Webpage available at :https://sourceforge.net/projects/msc-generator/.
"Connected Components in an Undirected Graph", .geeksforgeeks, Retrieved on Nov. 1, 2024, Webpage available at :https://www.geeksforgeeks.org/connected-components-in-an-undirected-graph/.
Office action received for corresponding Finnish U.S. Patent Application No. 20236301, dated Apr. 15, 2024, 13 pages.
(Continued)

*Primary Examiner* — Faruk Hamza
*Assistant Examiner* — Cassandra L Decker
(74) *Attorney, Agent, or Firm* — Nokia Technologies Oy

(57) ABSTRACT

There is herein disclosed a network node of a wireless communication system. The network node has means for selecting a first group of cells. Each cell of the first group of cells is a secondary cell, SCell, for carrier aggregation, CA, on a user equipment, UE, of the wireless communication system. The network node has means for obtaining a first set of labelled data for the first group of cells. The labelled data includes performance information regarding the first group of cells. The network node has means for training a machine learning model for the first group of cells using the first set of labelled data. The machine learning model is configured to be implemented on the network node of the wireless communication system for SCell selection. The network node has means for determining whether the machine learning model meets a performance criteria for at least one cell of the first group of cells.

16 Claims, 12 Drawing Sheets

(56) References Cited

OTHER PUBLICATIONS

Ryden et al., "Predicting Strongest Cell on Secondary Carrier using Primary Carrier Data", IEEE Wireless Communications and Networking Conference Workshops (WCNCW): 7th International Workshop on Self-Organizing Networks (IWSON), Apr. 15-18, 2018, pp. 137-142.
Office action received for corresponding Finnish Patent Application No. 20236301, dated Oct. 10, 2024, 9 pages.
Extended European Search Report received for corresponding European Patent Application No. 24212690.2, dated Apr. 4, 2025, 11 pages.
"3rd Generation Partnership Project; Technical Specification Group Radio Access Network; Evolved Universal Terrestrial Radio Access (E-UTRA) and NR; Study on enhancement for Data Collection for NR and EN-DC (Release 17)", 3GPP TR 37.817, V17.0.0, Apr. 2022, pp. 1-23.

* cited by examiner

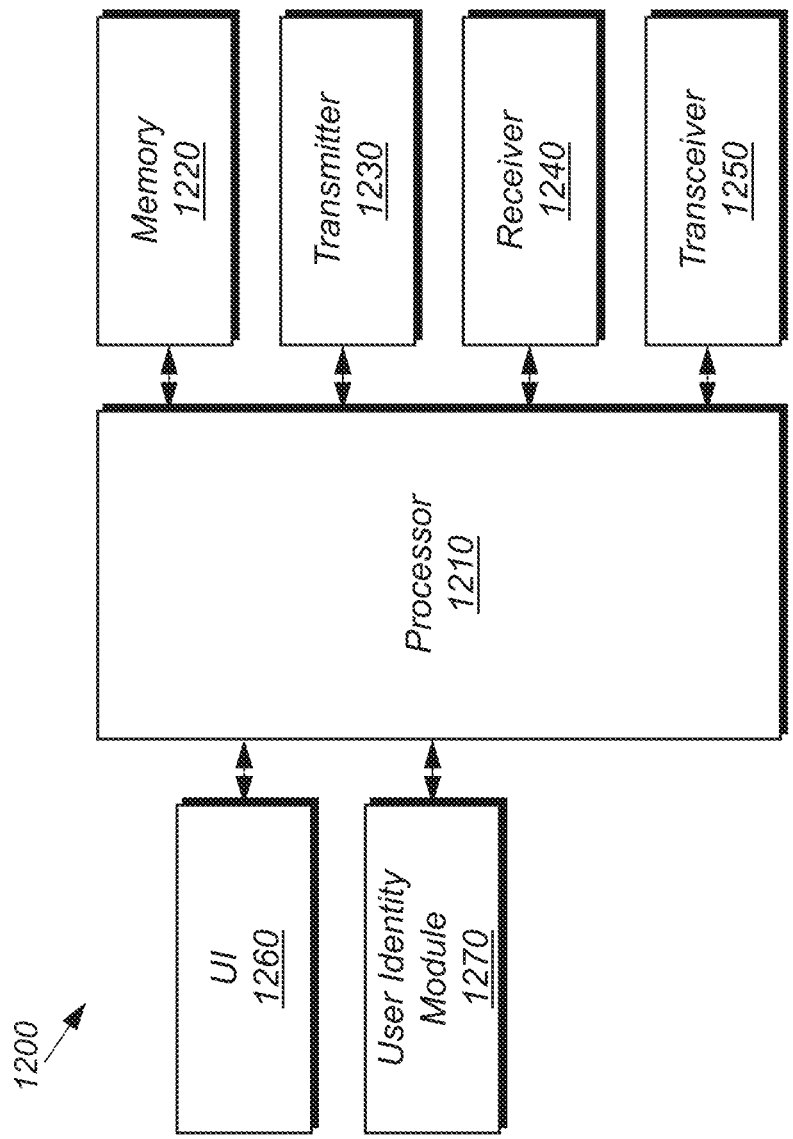

SECONDARY CELL SELECTION

RELATED APPLICATION

This application claims benefit of priority from Finnish Patent App. No. 20236301, filed Nov. 24, 2023, the disclosure of which is hereby incorporated in its entirety by reference herein.

FIELD

Example embodiments may relate to an apparatus, method and/or computer program for secondary cell selection. In particular, example embodiments relation to an apparatus for enhanced training of machine learning based secondary cell selection for carrier aggregation.

BACKGROUND

Communication systems enable communication between two or more nodes or devices, such as fixed or mobile communication devices. Signals can be carried on wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, network nodes or access points, which are referred to as enhanced Node AP or Evolved Node B (eNBs), provide wireless access within a coverage area or cell. In LTE, mobile devices, or mobile stations are referred to as user equipment (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

Operators of cellular networks have been undertaking initiatives to enable greater use of open interfaces as well as analytics and machine learning and real-time analytics in the radio access network (RAN), especially for radio resource management (RRM) functions, in an effort to improve the performance and automation of the network. The exemplary embodiments herein describe techniques for optimizing secondary cell selection in carrier aggregation and dual/multi-connectivity for LTE AND 5G. Furthermore, the disclosure herein provides an apparatus for enhanced training of machine learning based secondary cell selection for carrier aggregation.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described a network node comprising means for selecting a first group of cells, wherein each cell of the first group of cells is a secondary cell, SCell, for carrier aggregation, CA, on a user equipment, UE, of a wireless communication system. The network node further comprises means for obtaining a first set of labelled data for the first group of cells. The labelled data comprises performance information regarding the first group of cells. The network node further comprises means for training a machine learning model for the first group of cells using the first set of labelled data. The machine learning model is configured to be implemented on the network node of the wireless communication system for SCell selection. The network node further comprises means for determining whether the machine learning model meets a performance criteria for at least one cell of the first group of cells.

In some embodiments, the means for determining whether the machine learning model meets the performance criteria for at least one cell of the first group of cells may include: means for implementing the machine learning model on at least a first cell of the first group of cells to determine a performance value for the first cell and means for determining whether the performance value meets or does not meet a threshold value for the performance criteria.

In some embodiments, the network node may comprise means for, upon determining that the performance value meets the threshold value for the at least first cell, implementing the machine learning model on the network node of the wireless communication system for SCell selection and/or sending the machine learning model to a further network node for implementation.

In some embodiments, the network node may comprise means for, upon determining that the performance value does not meet the threshold value for the at least first cell, performing a fine tuning training process to the machine learning model for the at least first cell.

In some embodiments, the fine tuning process may comprise: means for obtaining local set of labelled data for the at least first cell, means for performing further training of the machine learning model for the at least first cell using the local set of labelled data and means for obtaining, from the further training of the machine learning model, a refined machine learning model for the at least first cell.

In some embodiments, the network node may comprise means for, implementing the refined machine learning model, for the at least first cell of the first group of cells, on the network node of the wireless communication system for SCell selection and/or sending the refined machine learning model to a further network node for implementation.

In some embodiments, obtaining the first set of labelled data for the first group of cells may comprise means for receiving the first set of labelled data from a further network node.

In some embodiments, the first set of labelled data and/or the local set of labelled data may comprise at least one of the following: a primary cell spectral efficiency, a primary cell path loss, a primary carrier load, a secondary carrier load and an angle of arrival or departure of at least one reference signal.

In some embodiments, the means for selecting the first group of cells may comprises means for receiving, a request to perform training of the first group of cells, wherein the request comprises notification of the identity of the first group of cells.

In some embodiments, the request is received from an operation and maintenance module, OAM, or a further network node.

According to a second aspect, there is described an apparatus for a wireless communication system. The apparatus comprise means for selecting a first group of cells, wherein each cell of the first group of cells is a secondary cell, SCell, for carrier aggregation, CA, on a user equipment, UE, of the wireless communication system. The apparatus comprises means for obtaining a first set of labelled data for the first group of cells. The labelled data comprises performance information regarding the first group of cells. The apparatus comprises means for training a machine learning model for the first group of cells using the first set of labelled data. The machine learning model is configured to be implemented on a network node of the wireless communication system for SCell selection. The apparatus comprises means for transmitting, to the network node, the machine learning model.

In some embodiments, the apparatus comprises a 5G network data analytics function, NWDAF.

In some embodiments, the means for selecting the first group of cells, may comprise means for receiving, a request, from an operation and maintenance module, OAM, to perform training of the first group of cells.

In some embodiments, the means for obtaining a first set of labelled data for the first group of cells, may comprise means for receiving the first set of labelled data from the OAM.

In some embodiments, the means for transmitting, to the network node, the machine learning model, may comprise transmitting the machine learning model to the OAM, wherein the OAM is configured to redistribute the machine learning model to the network node.

In some embodiments, the apparatus may further comprise: means for receiving a notification that further training of the machine learning model is required, means for obtaining local labelled data for at least a first cell of the first group of cells, means for performing further training of the machine learning model for the at least first cell using the local labelled data, and means for obtaining, from the further training of the machine learning model, a refined machine learning model for the first cell of the first group of cells.

In some embodiments, the first set of labelled data and/or the local set of labelled data may comprise at least one of the following: a primary cell spectral efficiency, a primary cell path loss, a primary carrier load, a secondary carrier load and an angle of arrival or departure of at least one reference signal.

According to a third aspect, there is described a method comprising selecting a first group of cells. Each cell of the first group of cells is a secondary cell, SCell, for carrier aggregation, CA, on a user equipment, UE, of a wireless communication system. The method further comprises obtaining a first set of labelled data for the first group of cells. The labelled data comprises performance information regarding the first group of cells. The method further comprises training a machine learning model for the first group of cells using the first set of labelled data. The machine learning model is configured to be implemented on the network node of the wireless communication system for SCell selection. The method further comprises determining whether the machine learning model meets a performance criteria for at least one cell of the first group of cells.

In some embodiments, determining whether the machine learning model meets the performance criteria for at least one cell of the first group of cells may include: implementing the machine learning model on at least a first cell of the first group of cells to determine a performance value for the first cell and determining whether the performance value meets or does not meet a threshold value for the performance criteria.

In some embodiments, the network node may comprise, upon determining that the performance value meets the threshold value for the at least first cell, implementing the machine learning model on the network node of the wireless communication system for SCell selection and/or sending the machine learning model to a further network node for implementation.

In some embodiments, the network node may comprise, upon determining that the performance value does not meet the threshold value for the at least first cell, performing a fine tuning training process to the machine learning model for the at least first cell.

In some embodiments, the fine tuning process may comprise: obtaining local set of labelled data for the at least first cell, performing further training of the machine learning model for the at least first cell using the local set of labelled data and obtaining, from the further training of the machine learning model, a refined machine learning model for the at least first cell.

In some embodiments, the network node may comprise, implementing the refined machine learning model, for the at least first cell of the first group of cells, on the network node of the wireless communication system for SCell selection and/or sending the refined machine learning model to a further network node for implementation.

In some embodiments, obtaining the first set of labelled data for the first group of cells may comprise means for receiving the first set of labelled data from a further network node.

In some embodiments, the first set of labelled data and/or the local set of labelled data may comprise at least one of the following: a primary cell spectral efficiency, a primary cell path loss, a primary carrier load, a secondary carrier load and an angle of arrival or departure of at least one reference signal.

In some embodiments, for selecting the first group of cells may comprises receiving, a request to perform training of the first group of cells, wherein the request comprises notification of the identity of the first group of cells.

In some embodiments, the request is received from an operation and maintenance module, OAM, or a further network node.

According to a fourth aspect, there is described a method comprising selecting a first group of cells. Each cell of the first group of cells is a secondary cell, SCell, for carrier aggregation, CA, on a user equipment, UE, of a wireless communication system. The method further comprises obtaining a first set of labelled data for the first group of cells. The labelled data comprises performance information regarding the first group of cells. The method further comprises training a machine learning model for the first group of cells using the first set of labelled data. The machine learning model is configured to be implemented on a network node of the wireless communication system for SCell selection. The method further comprises transmitting, to the network node, the machine learning model.

In some embodiments, selecting the first group of cells, may comprise receiving, a request, from an operation and maintenance module, OAM, to perform training of the first group of cells.

In some embodiments, obtaining a first set of labelled data for the first group of cells, may comprise receiving the first set of labelled data from the OAM.

In some embodiments, transmitting, to the network node, the machine learning model, may comprise transmitting the machine learning model to the OAM, wherein the OAM is configured to redistribute the machine learning model to the network node.

In some embodiments, the apparatus may further comprise: receiving a notification that further training of the machine learning model is required, obtaining local labelled data for at least a first cell of the first group of cells, performing further training of the machine learning model for the at least first cell using the local labelled data, obtaining, from the further training of the machine learning model, a refined machine learning model for the first cell of the first group of cells.

In some embodiments, the first set of labelled data and/or the local set of labelled data may comprise at least one of the following: a primary cell spectral efficiency, a primary cell path loss, a primary carrier load, a secondary carrier load and an angle of arrival or departure of at least one reference signal.

According to a fifth aspect, there is provided a computer program product comprising a set of instructions which, when executed on an apparatus, is configured to cause the apparatus to carry out the method of any preceding method definition.

According to a sixth aspect, there is provided a non-transitory computer readable medium comprising program instructions stored thereon for performing a method, comprising selecting a first group of cells. Each cell of the first group of cells is a secondary cell, SCell, for carrier aggregation, CA, on a user equipment, UE, of a wireless communication system. The method further comprises obtaining a first set of labelled data for the first group of cells. The labelled data comprises performance information regarding the first group of cells. The method further comprises training a machine learning model for the first group of cells using the first set of labelled data. The machine learning model is configured to be implemented on the network node of the wireless communication system for SCell selection. The method further comprises determining whether the machine learning model meets a performance criteria for at least one cell of the first group of cells.

According to a seventh aspect, there is provided a non-transitory computer readable medium comprising program instructions stored thereon for performing a method, comprising selecting a first group of cells. Each cell of the first group of cells is a secondary cell, SCell, for carrier aggregation, CA, on a user equipment, UE, of a wireless communication system. The method further comprises obtaining a first set of labelled data for the first group of cells. The labelled data comprises performance information regarding the first group of cells. The method further comprises training a machine learning model for the first group of cells using the first set of labelled data. The machine learning model is configured to be implemented on a network node of the wireless communication system for SCell selection. The method further comprises transmitting, to the network node, the machine learning model.

BRIEF DESCRIPTION OF THE DRAWINGS

Example embodiments will now be described by way of non-limiting example, with reference to the accompanying drawings, in which:

FIG. 12 shows, by way of example, a block diagram of an apparatus.

DETAILED DESCRIPTION

Example embodiments may relate to an apparatus, method and/or computer program for improved selection of secondary cells for carrier aggregation based on enhanced training of machine learning systems.

Figure 1:
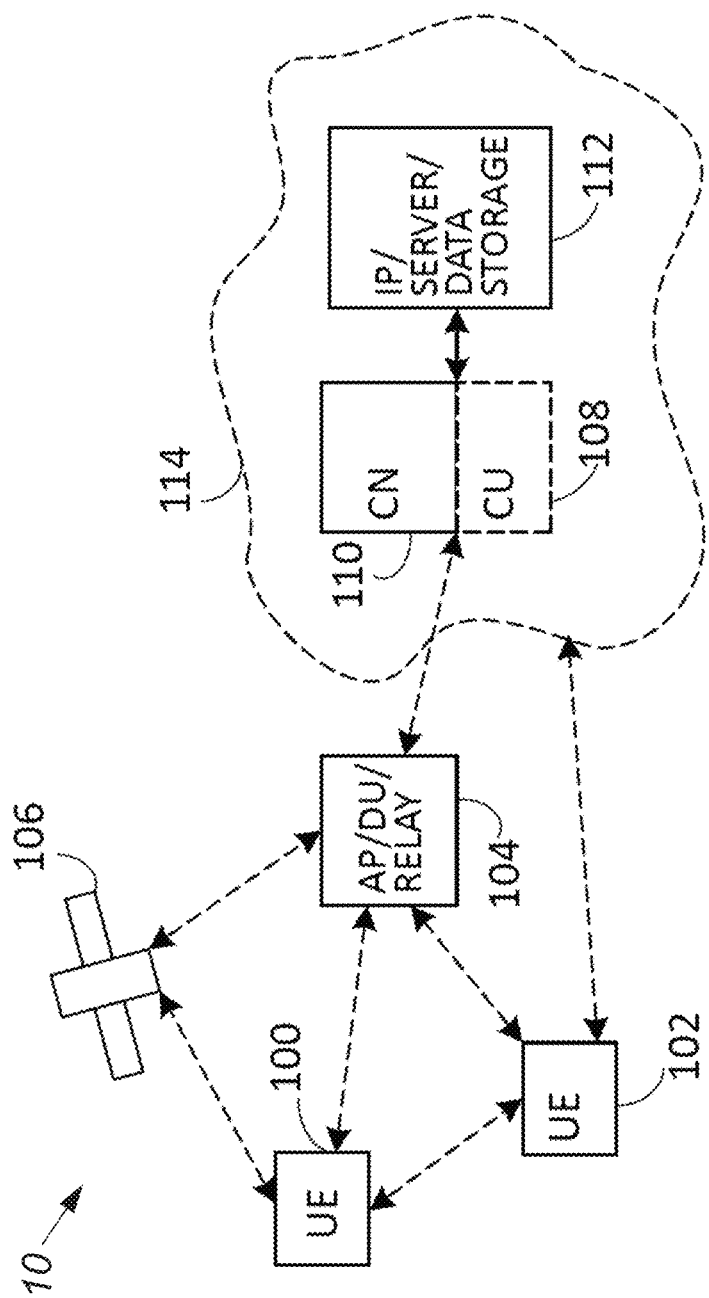
FIG. 1 shows, by way of example, a network architecture of a communication system.

FIG. 1 shows, by way of an example, a network architecture of a communication system which is a RAN. In the following, different exemplifying embodiments will be described using, as an example of an access architecture to which embodiments may be applied, a radio access architecture based on long term evolution advanced (LTE Advanced, LTE-A) or new radio (NR), also known as fifth generation (5G), without restricting the embodiments to such an architecture, however. Embodiments may also be applied to other kinds of communications networks having suitable means by adjusting parameters and procedures appropriately. Some examples of other options for suitable systems are the universal mobile telecommunications system=radio access network, long term evolution (LTE), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 shows a wireless communication system 10. FIG. 1 shows first and second user devices 100, 102 (also herein referred to as user equipments, UEs) configured to be in a wireless connection on one or more communication channels in a cell with a network node, such as a network node 104 providing a cell. The physical link from a user device, e.g. the first user device 100, to the network node 104 is called the uplink (UL) or reverse link and the physical link from the network node to the user device is called the downlink (DL) or forward link. It should be appreciated that network nodes and their functionalities may be implemented by using any node, host, server or access point entity suitable for such a usage. A communications system typically comprises more than one network node in which case the network nodes may also be configured to communicate with one another over links, wired or wireless, designed for the purpose. These links may be used for signaling purposes. A network node is a computing device configured to control the radio resources of the communication system it is coupled to. A network node may also be referred to as a TRP, base station (BS), an access point or any other type of interfacing device including a relay station capable of operating in a wireless environment. A network node may include or is coupled to transceivers. From the transceivers of the network node 104, a connection may be provided to an antenna unit that establishes bi-directional radio links to user devices, such as the first and second user devices 100, 102. The antenna unit may comprise a plurality of antennas or antenna elements, for example arranged as an antenna array. The network node 104 may further be connected to a core network 110.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant, handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

5G enables using multiple input and multiple output technology at both a UE and network node side, many more base stations or nodes than the LTE. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHZ) as FR2, respectively. Integration with the LTE may be implemented, at least in the early phase, as a system, where macro coverage is provided by the LTE and 5G radio interface access comes from small cells by aggregation to the LTE.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

An edge cloud may be brought into radio access networks (RANs). Using an edge cloud may mean access node operations to be carried out, at least partly, in a server, host or node operationally coupled to a remote radio head or base station comprising radio parts. It is also possible that node operations will be distributed among a plurality of servers, nodes or hosts.

Applications of cloud RAN architecture enables RAN real time functions being carried out at the RAN side (in a distributed unit, DU 104) and non-real time functions being carried out in a centralized manner (in a centralized unit, CU 108).

In wireless communication, carrier aggregation (CA) is a technique used to increase the data rate per user, whereby multiple frequency carriers) are allocated to the cell which then has more resources allocated to UEs. As such, the maximum possible data rate per user may be increased the more frequency blocks are assigned to a UE. The sum data rate of a cell is also increased because of a better resource utilization. In addition, load balancing is possible with CA. Cell selection schemes for CA systems taking into account the optimal values for the training length and power, the number of the probed sub-channels and the feedback threshold such that the sum rate is also important for optimal achievable capacity.

Cell selection may be based upon CA. CA is a key functionality of RAN in LTE and 5G, allowing UEs to connect simultaneously to cells on multiple carriers, enabling the UEs to reach higher throughputs as well as enabling fast-time-scale load-balancing across multiple carriers. As shown in the network architecture 200 of FIG. 2, a UE 202 will generally have a primary cell, known as a Pcell 204A, the Pcell 204A is typically the cell through which the UE first connects to a RAN node 203. There may be alternative Pcells 204B for different RAN nodes 208. The RAN node 203 (typically via a Pcell 204A) may provide the UE 202 with additional configuration information to enable it to simultaneously connect to additional cells on carriers other than the Pcell 204A, which are known as the UE's secondary cells (Scell) 206A. The RAN node 203 decides which cells (e.g., carriers) should be configured as Scells 206A for a given UE 202. In carrier aggregation, a UE's 202 data stream across the Pcell 204A and different Scells 206A is typically aggregated at an RLC layer. An Scell 206A, may be hosted at the same RAN node 204A as the Pcell 204A (intra-site carrier aggregation), or a different RAN node 208 (inter-site carrier aggregation) may host an Scell 206B. Either Pcell 204A, 204B or Scell 206A, 206B may flexibly use radio access technologies such as LTE or 5G/New Radio (5G/NR). In dual connectivity (or multi-connectivity) as well, the UE 202 can connect simultaneously to multiple cells. Typically a given UE's 202 Scells 206A, 206B in DC or MC will be hosted at the different RAN node 208 than the RAN node 203 hosting the UE's Pcell 204A. The Pcell 204A RAN node 203 (called MeNB or Master eNB) can interact with the different RAN node 208 hosting the Scell (called SeNB or Secondary eNB) over an interface such as X2 or Xn. Dual connectivity or multi-connectivity may even be used together with carrier aggregation, for example wherein a UE connects to a given SeNB 208 by dual connectivity, and then enters carrier aggregation with multiple Scells 206B hosted at that SeNB 208. Either MeNB 203 or SeNB 208 may flexibly use radio access technologies such as LTE or 5G/New Radio (5G/NR). Embodiments described herein may often refer to carrier aggregation and selection/assignment of Scells 206A, 206B for UEs 202, but it should be understood that this broadly encompasses dual and multi-connectivity (and the selection of SeNBs for UEs), as well as the possible combined usage of carrier aggregation and dual connectivity. In general the term 'carrier aggregation (CA)' may be broadly used to encompass also dual and multi connectivity, and the term 'Scell' may be used broadly to also encompass SCG or SeNB, and the term 'Pcell' may be used broadly to also encompass MeNB.

Scells may be on different bands (that is, carriers) than the UE's Pcell, and thus may have significantly different signal, interference and coverage characteristics than an Pcell. For instance, the Pcell may be on a lower band (e.g., 700 or 800 MHZ) while the Scell may be on 2.6 GHz or 3.5 GHz. The Pcell is quite likely to be a macro-cell. But the Scell may be either (i) a macro cell hosted at the same site as Pcell, or (ii) a macro cell hosted at a different site than the Pcell or (iii) a small cell hosted at a different site.

Figure 3B:
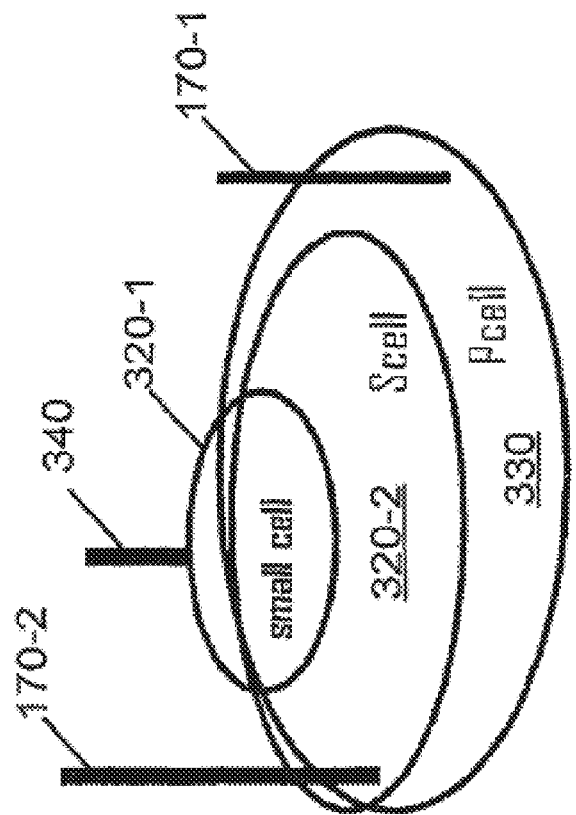
FIGS. 3A and 3B show, by way of example, a network architecture of a primary cell (PCell) and secondary cell (SCell) for carrier aggregation.
Figure 3A:
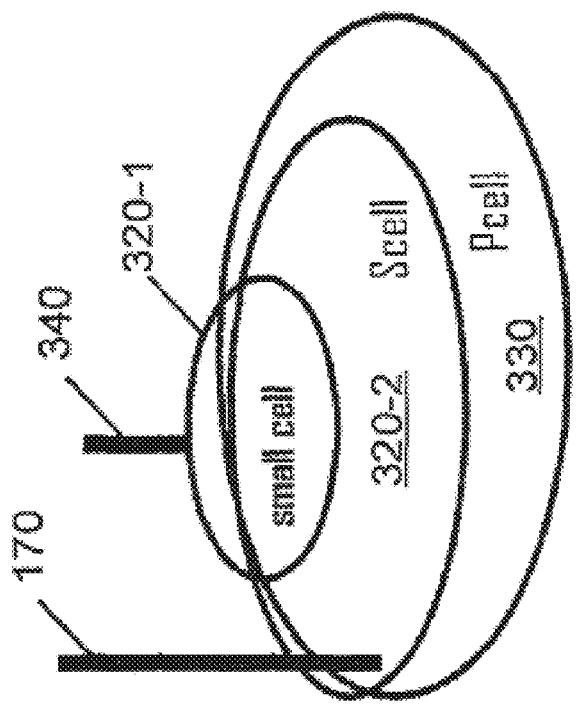

FIGS. 3A and 3B are examples of Scell and Pcell deployment scenarios. In FIG. 3A, both the Pcell 330 and Scell 320-2 are formed by a RAN node 170, while the small cell 320-1 is formed by another RAN node 340. This illustrates (i) and (iii). In FIG. 3B, the Pcell 330 is formed by the RAN node 170-1, the Scell 320-2 is formed by the RAN node 170-2, and the small cell 320-1 is formed by another RAN node 340. This illustrates (ii) and (iii).

With respect to (ii), for instance, if Scells 320 are on 3.5 GHz while the Pcell 330 is at 700 Mz, the 3.5 GHz band may need a more dense deployment than 700 MHZ, with many more sites hosting 3.5 GHz than 700 MHz. So in this case from the perspective of a given 700 MHz cell, there may be multiple 3.5 GHz cells which can be potential Scells 320.

The disclosure herein relates to CA Scell selection optimization and in particular to machine learning (ML) based 5G CA Scell selection. ML training may be performed at either a network node embedded in a wireless communication system or in a separate apparatus that forms part of the wireless communication system (for example, a 5G network data analytics function, NWDAF). Both scenarios will be discussed herein: the ML training performed at a network node embedded in a wireless communication system discussed in relation to FIG. 9 and the ML training performed at, for example, an NWDAF is discussed in relation to FIG. 10.

The use of ML for CA Scell selection is beneficial because an Scell selection algorithm (which includes Scell addition and Scell activation) can be enhanced by considering UE's dynamic Scell spectral efficiency (SE) as Scell selection factor. Traditional Scell selection algorithms in legacy LTE systems feature only static available measurements of Scell SE, whereas the proposed ML learning approach allows measurements of Scell SE by evaluating the expected SE of the Scell without explicitly measuring it.

Furthermore, the proposed ML mechanism can help to develop a way of predicting the SE for Scell without having to activate the Scell first. This is based on Pcell measurements of a UE (such as "RF signature" or "RF fingerprint").

Figure 4:
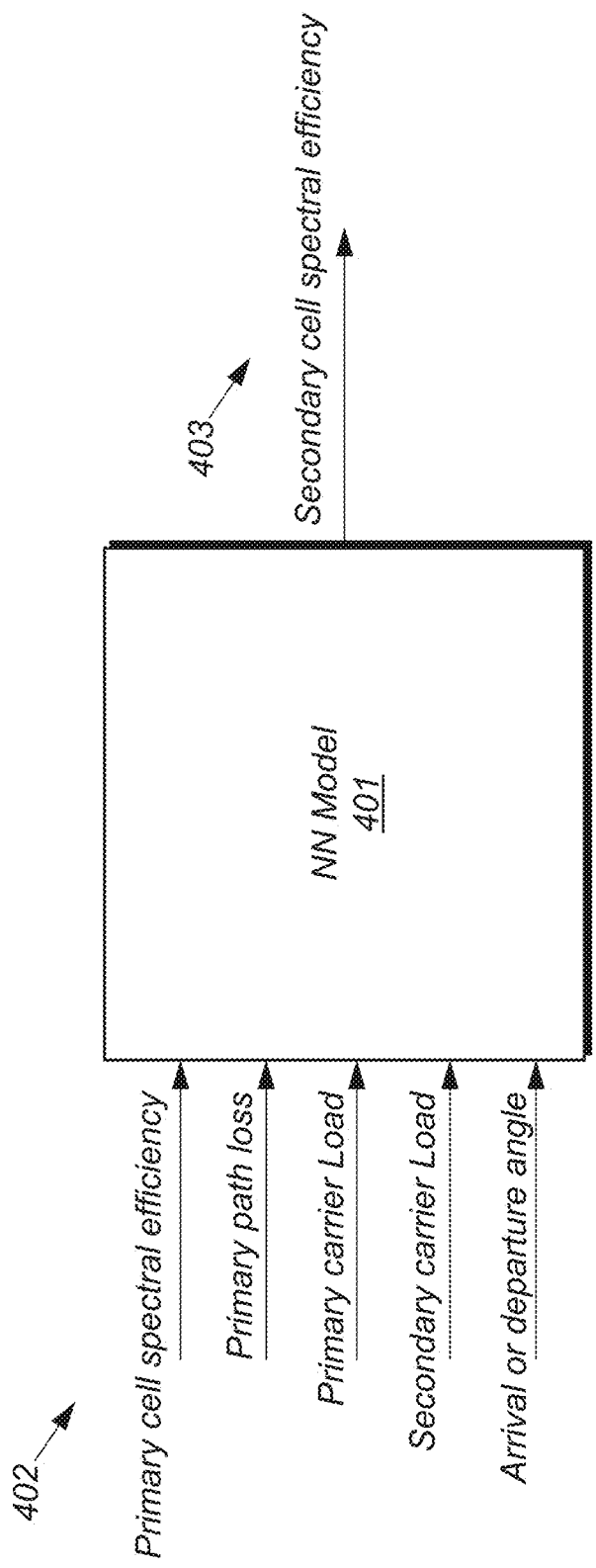
FIG. 4 shows, by way of example, a neural network model.

FIG. 4 shows an example neural network NN model 401. The NN model 401 takes inputs 402 based on Pcell and Scell measurements. For example, these measurements may include, but are not limited to, a primary cell spectral efficiency, a primary cell path loss, a primary carrier load, a secondary carrier load, an angle of arrival or departure. The angle of arrival or departure refers to the angle of arrival or departure of a beam from the UE. It may be calculated using beam identification, CQI (Channel Quality Indicator), PMI (Precoding Matrix Indicator), RI (Rank Indicator) or can be calculated using SRS (Sounding Reference Signal) reports.

As such, the prediction of Scell SE is dynamic and based on Pcell measurements. A predicted Scell SE is output 403 from the NN model 401 based on the inputs 402 and after the NN model 401 has been applied. This approach allows a network node to quickly select UE's best Scell and most appropriate SE value to determine the best Scell selection. The proposed approach saves Scell selection and link adaption time.

Figure 2:
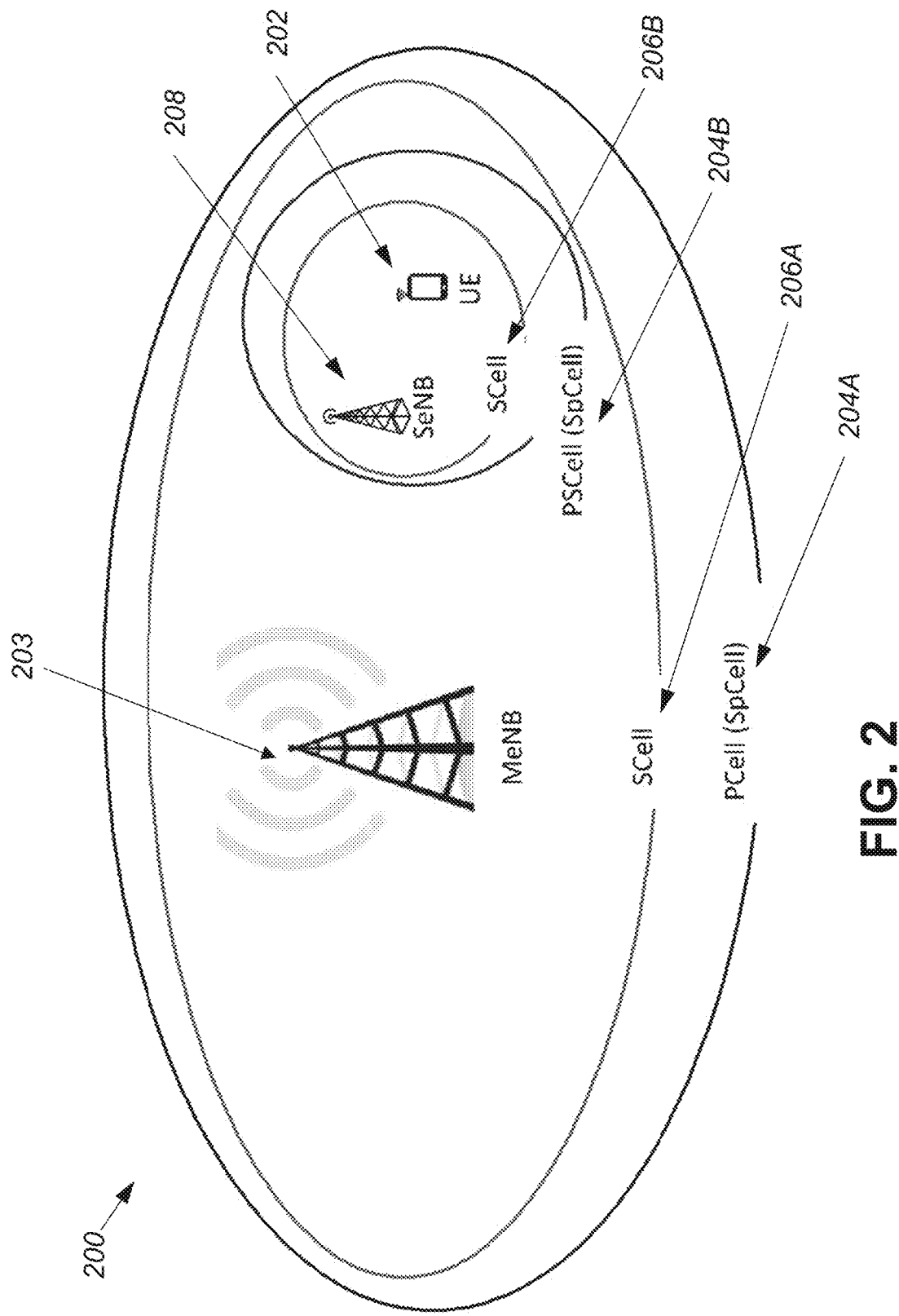
FIG. 2 shows, by way of example, a network architecture demonstrating carrier aggregation.
Figure 5:
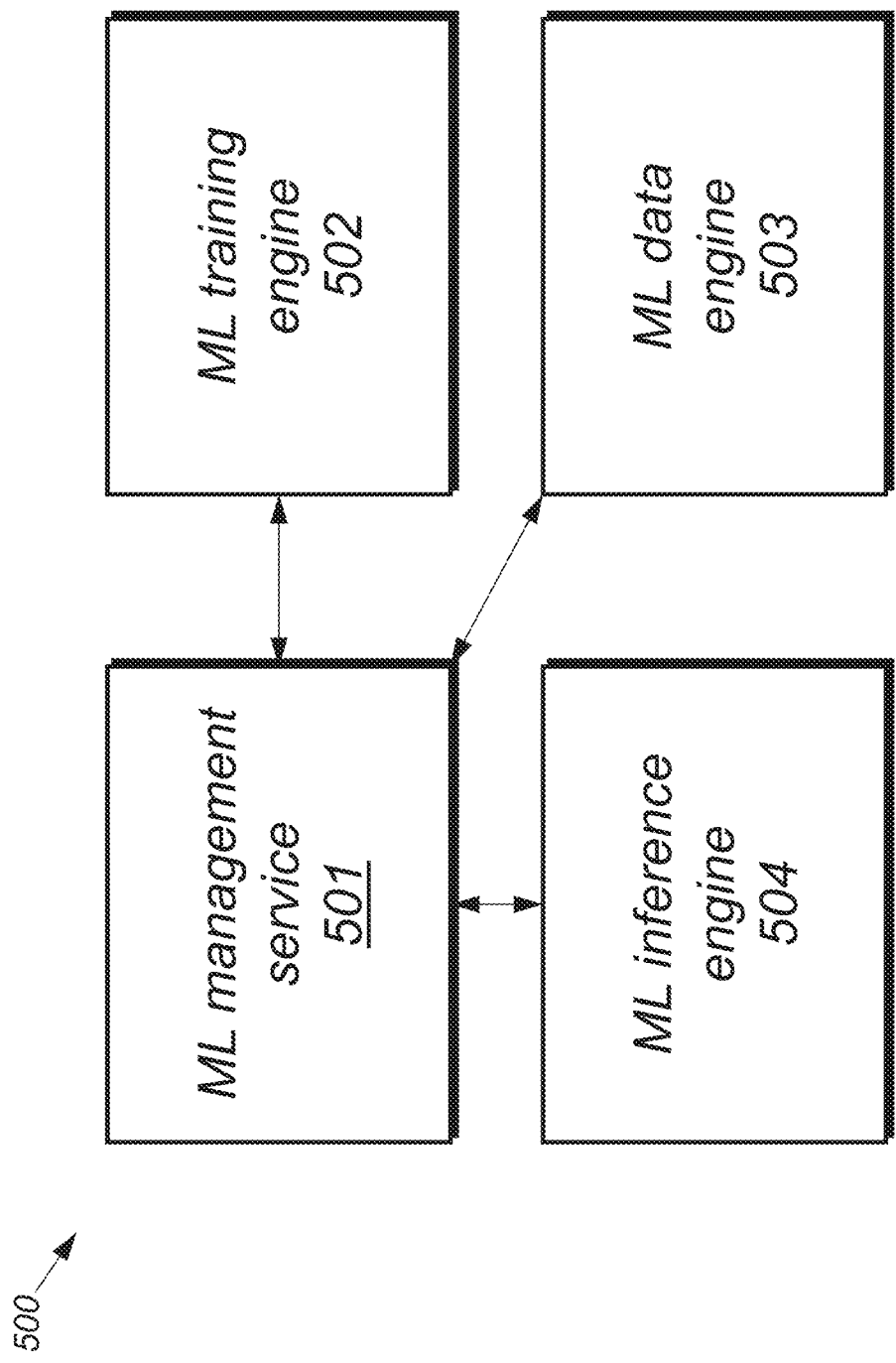
FIG. 5 shows, by way of example, a machine learning architecture.

FIG. 5 shows a training network architecture 500 for a NN model, such as the NN model 401 of FIG. 4. The training network architecture 500 may be located at either a network node (e.g. 203 or 208 as shown in FIG. 2) embedded in a wireless communication system or in a separate apparatus that forms part of the wireless communication system (for example, a 5G network data analytics function, NWDAF). The separate apparatus could be any other entity in the network which could support ML model training. The network architecture 500 is used to train the NN model 401 and comprises a ML management service 501. The ML management service 501 collates information received from and co-ordinates the processes run at a ML training engine 502, a ML data engine 503 and ML inference engine 504. The network architecture 500 is suitable for model training and model retraining (training a new model using old and new data). The network architecture 500 is also suitable for the fine-tuning of machine learning models, for example, by tuning the weights of the old model using new data. The ML inference engine 504 may use a trained ML model provided by the ML training engine 502 and the ML training engine may perform ML model training using labelled data provided by the ML data engine 503.

The disclosure herein is an implementation procedure which groups cells of and optimizes data collection to provide a single ML model for the CA Scell selection use case. The main advantages of such approach are twofold: (1) Improving the model accuracy and (2) optimizing the training cost in terms of used resources and necessary time.

Figure 6:
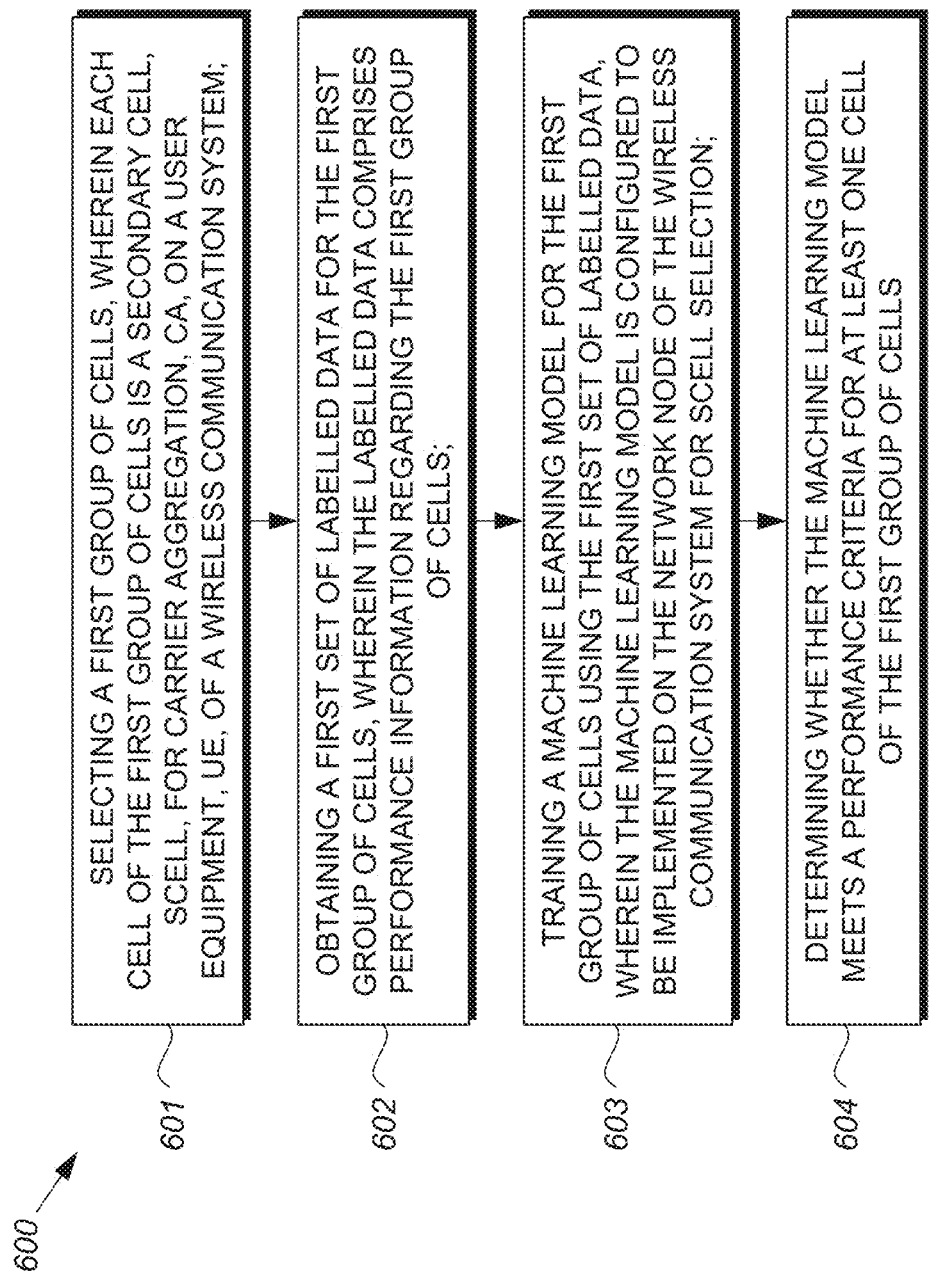
FIG. 6 shows, by way of example, a flowchart of a method.

FIG. 6 shows, by way of example, a flowchart of a method 600 according to example embodiments. Each element of the flowchart may comprise one or more operations. The operations may be performed in hardware, software, firmware or a combination thereof. For example, the operations may be performed, individually or collectively, by a means, wherein the means may comprise at least one processor; and at least one memory storing instructions that, when executed by the at least one processor, cause the performance of the operations.

The method 600 of FIG. 6 shows ML training performed at a network node embedded in a wireless communication system, such as the wireless communication system 10 of FIG. 1.

The method 600 may comprise a first operation 601 of selecting a first group of cells. The method may be conducted on a network node (e.g. RAN or base station) of a wireless communication system. The first group of cells are all SCells for CA on a UE of the wireless communication system.

In some embodiments, the first operation may include gathering information for the Scells and CA relations. This information may then be used to perform cell grouping to select a group of Scells for which is it appropriate to train a ML model. The grouping may be performed based on CA relationships between the selected Scells. As such, a first group of cells is selected for which ML model training will be performed. In some embodiments, multiple groups of cells will be determined (e.g. a second group of cells and a third group of cells, etc) and a separate ML model can be trained based on each group of cells. The first group of cells may be distinguished from e.g. the second group of cells, by different CA relationships that mean a single ML model would not be appropriate. The grouping may be based on collected Scells' information by following clustering methods to identify cells groups (further explanation of clustering methods is given below in relation to FIG. 11).

In some embodiments, the first operation 601 of selecting a first group of cells may include receiving, a request to perform training of the first group of cells. The request comprises notification of the identity of the first group of cells. The request may be received from an operation and maintenance module, OAM, or a further network node (i.e. a network node not performing the model training).

The method 600 may comprise a second operation 602 of obtaining a first set of labelled data for the first group of cells. The labelled data comprises performance information regarding the first group of cells. The performance information may relate to Pcell measurements of the first group of cells. The performance information from the Pcell measurements can be used as an indicator of likely SE for the Scell. The first set of labelled data may include, but is not limited to, a primary cell spectral efficiency, a primary cell path loss, a primary carrier load, a secondary carrier load, an angle of arrival or departure. The first set of labelled data may correspond to the inputs 402 as denoted in FIG. 4. The first set of local data is global data which covers all of the first group of cells.

In some embodiments the second operation 602 of obtaining a first set of labelled data for the first group of cells, may include receiving the first set of labelled data from a network node. The network node may be the same network node as the network node carrying out the ML model training or a different network node. In other words, the first set of labelled data can be obtained from another network node in a wireless communication system of which the network node is a part of. As such, the first set of labelled data includes information pertaining to Pcells which are supported by a different network node.

The method 600 may comprise a third operation 603 of training a ML model for the first group of cells using the first set of labelled data. The ML model may correspond to the NN model 401 of FIG. 4. The ML model may be configured to be implemented on the network node of the wireless communication system for Scell selection. As such, the ML model is configured to be used by the network node itself. The ML model may also be suitable to be used by different network nodes that form part of the wireless communication system. Implementation of the ML model includes using the ML model for Scell selection based on determined Scell SE predictions. The training of the ML model may comprise any known ML training methods and the training may include using labelled which corresponds to the model inputs 402 of FIG. 4 and determining an expected output SE gathered from past collected data (i.e. historical data).

The method 600 may comprise a fourth operation 604 of determining whether the machine learning model meets a performance criteria for at least one cell of the first group of cells.

The fourth operation 604 may further comprise implementing the ML model on at least a first cell of the first group of cells to determine a performance value for the first cell. Implementing the ML model comprises running the trained model (inference). The performance value may be a key performance indicator (KPI) such as an absolute error, mean square error or other indicator of model accuracy.

The fourth operation 604 may further comprise determining whether the performance value meets or does not meet a threshold value for the performance criteria.

Upon determining that the performance value meets the threshold value for the at least first cell, the fourth operation 604 may further comprise implementing the ML model on the network node of the wireless communication system for SCell selection. Additionally, or alternatively, the further operation 604 may comprise sending the machine learning model to a further network node for implementation. In other words, if the performance value meets (i.e. is equal to or higher than) the threshold value, it is determined that the ML model is suitable for use on an individual cell (i.e. the first cell) for which the performance has been tested. Therefore, the first cell may proceed with implementing the ML model.

Upon determining that the performance value does not meet the threshold value for the at least first cell, the fourth operation 604 may further comprise performing a fine-tuning training process to the ML model for the at least first cell which has been prepared for use for the whole first group of cells. In other words, if the performance value does not meet (i.e. is higher than) the threshold value for error it is determined that the ML model is not suitable for use on an individual cell (i.e. the first cell) for which the performance has been tested. Therefore, the first cell may not proceed with implementing the ML model. Instead, a fine turning training process must be applied to the ML model to make it suitable for use at the individual cell for which the threshold test was not met (i.e. the first cell).

Figure 8:
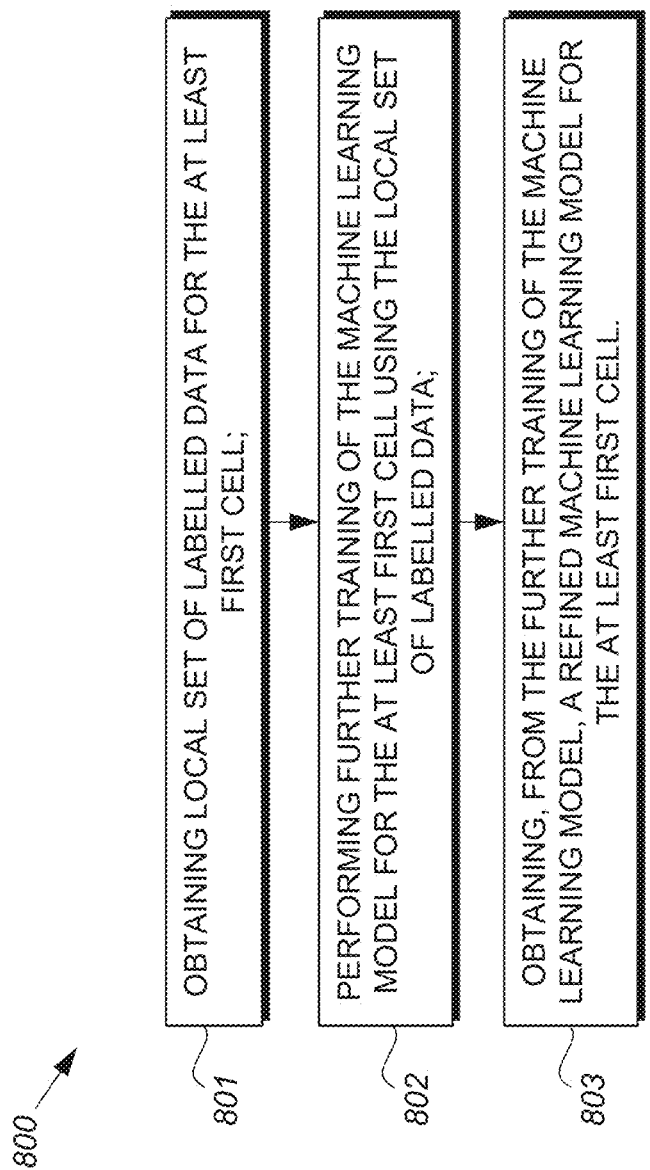
FIG. 8 shows, by way of example, a further flowchart of a method.

The fine-tuning process 800 is shown in FIG. 8. The fine-tuning process 800 includes a first operation 801 of obtaining local set of labelled data for the at least first cell. The local set of labelled data relates only to the individual cell for which the threshold test was not met. This means that the local set of labelled data more specifically tailored to the individual cell and as such may produce a more accurate input for fine-tuning the ML model. As for the first set of labelled data, local set of labelled data may include, but is not limited to, a primary cell spectral efficiency, a primary cell path loss, a primary carrier load, a secondary carrier load, an angle of arrival or departure. The local set of labelled data may correspond to the inputs 402 as denoted in FIG. 4.

The fine-tuning process 800 includes a second operation 802 of performing further training of the machine learning model for the at least first cell using the local set of labelled data. The further training may comprise the same training as performed at operation 603 or a different type of ML training. The further training may require much less local labelled data compared to the amount of labelled data that is used for the initial training.

The fine-tuning process 800 includes a third operation 803 of obtaining, from the further training of the machine learning model, a refined ML model for the at least first cell. The refined ML model is improved for the individual cell based on the further training of operation 802. As such, the refined ML model is more accurate for the individual cell.

After the fine-tuning process is complete, the refined ML model, for the at least first cell of the first group of cells (i.e. the individual cell) is suitable for implementation on the network node of the wireless communication system for Scell selection. Additionally, or alternatively, the refined ML model is suitable to be sent to a further network node for use. As such, the individual cell may now use the refined ML model.

Therefore, the proposed method tests the performance of each global model individually for each cell with the corresponding group and an accuracy KPI is compared with a predetermined threshold value to evaluate if the performance per cell is satisfactory or not. If the performance is acceptable, then the global model per group can be used for the cells within the considered group. In the contrary, if the performance for a specific cell is not satisfactory, then the global model (for the related cell group) goes through a fine-tuning training step using local cell labelled data. The obtained refined ML model is used for inference for the considered cell. This approach improves the accuracy of the ML for each individual cell by testing whether KPIs are met for each cell and, if not, improving the ML model. The approach also optimizes the training cost in terms of used resources and necessary time, because most cells may be trained in groups and only the cells for which the KPIs are not met, require additional fine-tuning. As such, less computing power is required to provide an accurate ML model for Scell selection.

Figure 7:
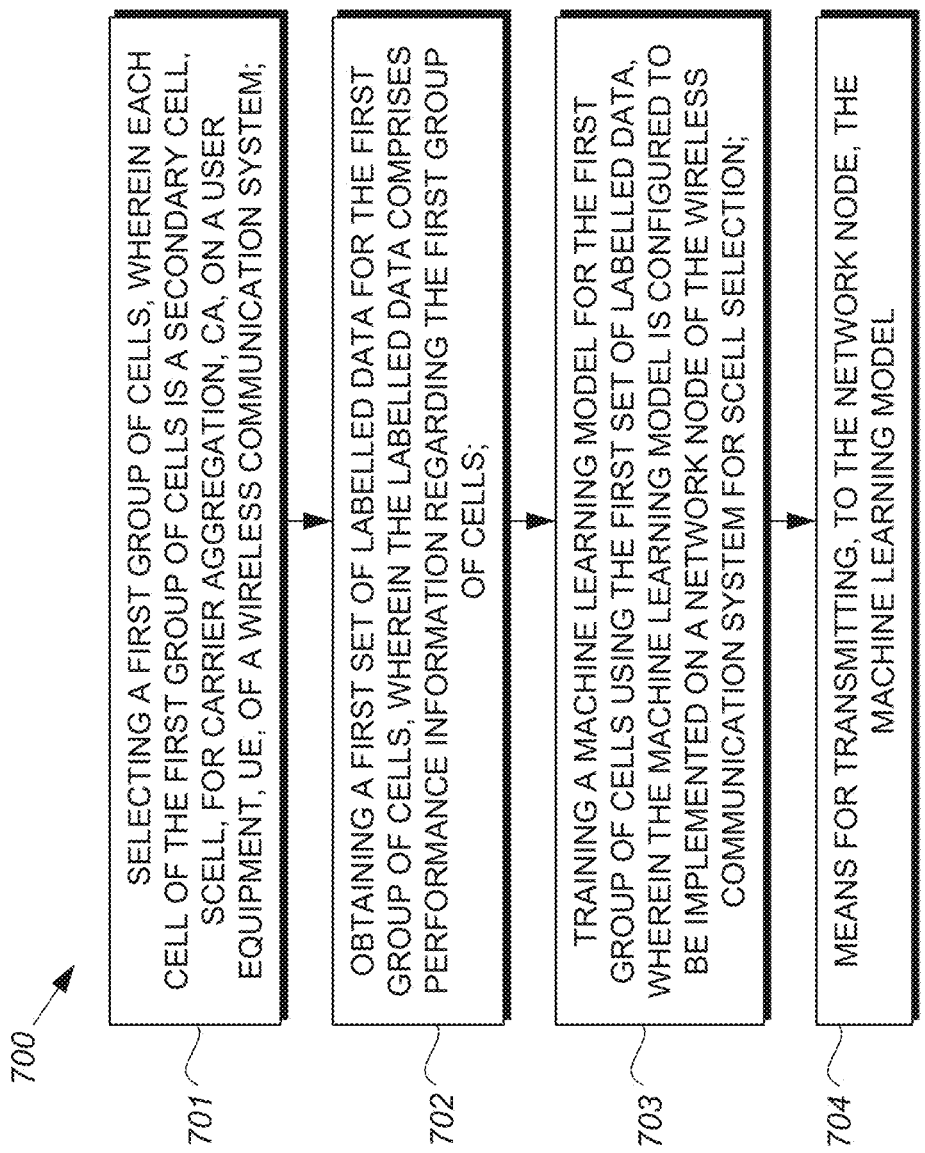
FIG. 7 shows, by way of example, a further flowchart of a method.

FIG. 7 shows, by way of example, a flowchart of a method 700 according to example embodiments. Each element of the flowchart may comprise one or more operations. The operations may be performed in hardware, software, firmware or a combination thereof. For example, the operations may be performed, individually or collectively, by a means, wherein the means may comprise at least one processor; and at least one memory storing instructions that, when executed by the at least one processor, cause the performance of the operations.

The method 700 of FIG. 7 shows ML training performed at a separate apparatus that forms part of a wireless communication system (for example, a 5G network data analytics function, NWDAF), such as the wireless communication system 10 of FIG. 1.

Operations 701 to 703 of the method 700 of FIG. 7 correspond to operations 601 to 603 of the method 600 of FIG. 6. As such, the same steps may apply.

The method 700 comprises a further operation 704 of transmitting, to the network node, an ML model.

The first operation 701 of the method 700 may optionally comprise receiving, a request, from an operation and maintenance module, OAM, to perform training of the first group of cells. As such the selecting of the first group of cells is triggered by the requested from the OAM.

The second operation 702 of the method 700 may optionally comprise receiving the first set of labelled data from the OAM. The OAM may request labelled data from one or multiple network nodes and collate this information at the OAM once it is received from the network node(s). Subsequently, the OAM sends the first set of labelled data to the apparatus.

The fourth operation 704 of the method 700 may optionally transmitting the ML model to the OAM. The OAM may then be configured to redistribute the ML model to the network node(s). As such the transmission of the ML model to the network node(s) from the apparatus may be direct or via the OAM.

The method 700 may further comprise, receiving a notification that further training of the machine learning model is required. The notification may be received from a network node(s) or the OAM. Upon receiving the notification the apparatus may perform further training of the ML model to produce a refine ML model. A fine-tuning process may be in accordance with the fine-tuning process 800 of FIG. 8.

Signalling Arrangements

Figure 9:
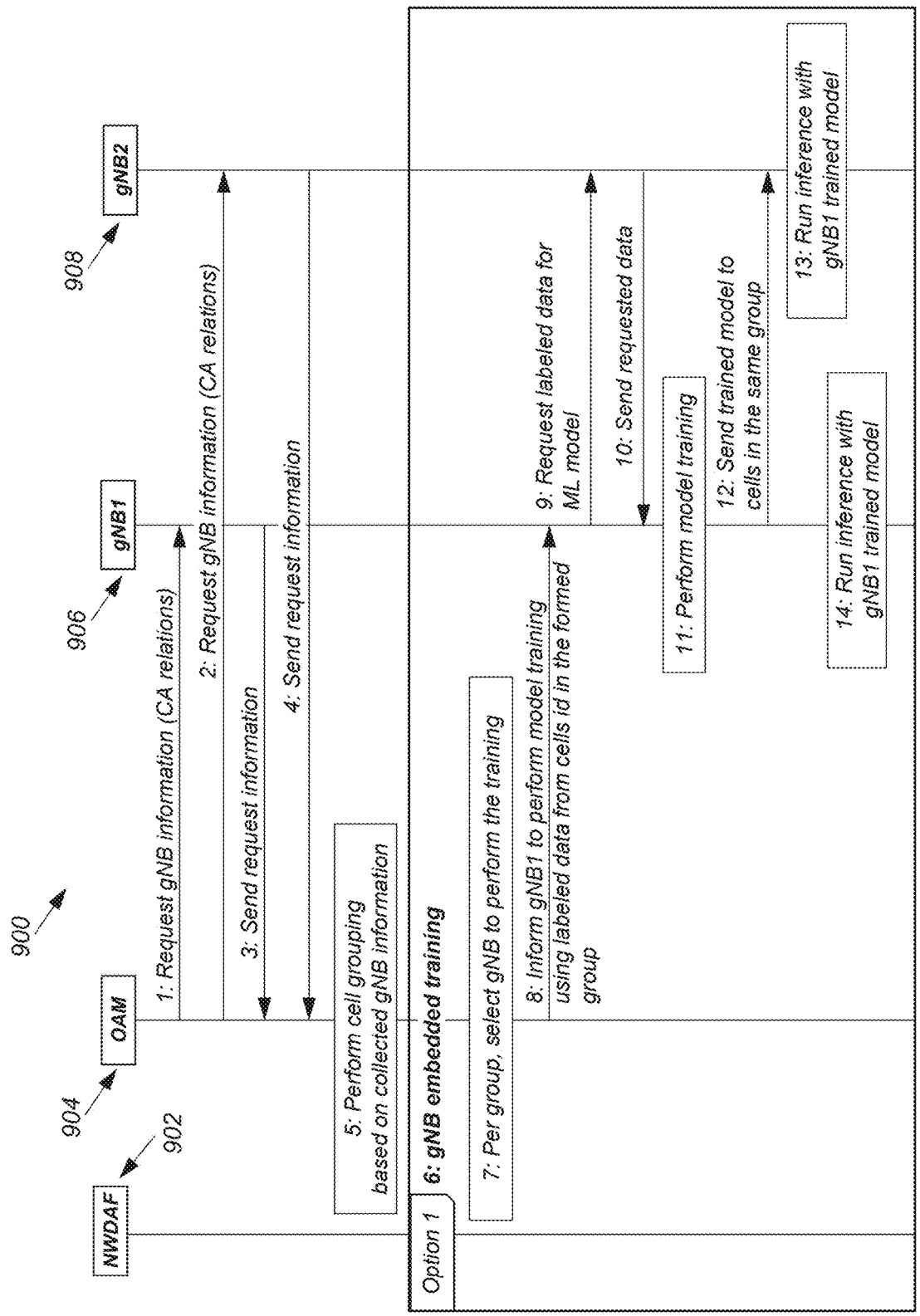
FIG. 9 shows, by way of example, a signalling procedure for network node embedded training.

Steps 1 to 5 of FIG. 9 shows the selecting and 'grouping' of cells according to a cell grouping algorithm. At step 1 and 2 the OAM 904 requests network node information including CA groupings from network nodes 906 and 908 (gNB1 and gNB2). The network nodes 906 and 908 send the requested information back to the OAM 904 at steps 3 and 4.

At step 5, cell grouping is performed at the OAM 904 based on the collected network node 906, 908 information. A cell grouping algorithm can be executed at the OAM 904 which in turn provides the cell to Site ID mapping. This site ID mapping is sent along with a 'Data Configuration File' to a network node 906. The OAM 904 may select per group the network node (in this instance network node 906) that will perform the model training or, alternatively, that the NWDAF will perform the model training.

For the method 600 of FIG. 6, the ML model training is realized by a network node. A signaling procedure based on network node embedded training is shown in FIG. 9.

As shown in FIG. 9 in this scenario the OAM 904 selects (see step 7) a network node 906 within a group to perform the training. At step 8, the selected gNB is informed and at step 9 requests labelled data from the other network node(s) 908 within his group. Once the data are received at step 10, the selected network node 906 can perform the model training at step 11 and share the trained model with the other network node(s) 908 in the group at step 12.

For the method 700 of FIG. 7, the ML model training is realized by an apparatus of the wireless communication system such as an NWDAF 902. A signaling procedure based on NWDAF 902 embedded training is shown in FIG. 10.

Figure 10:
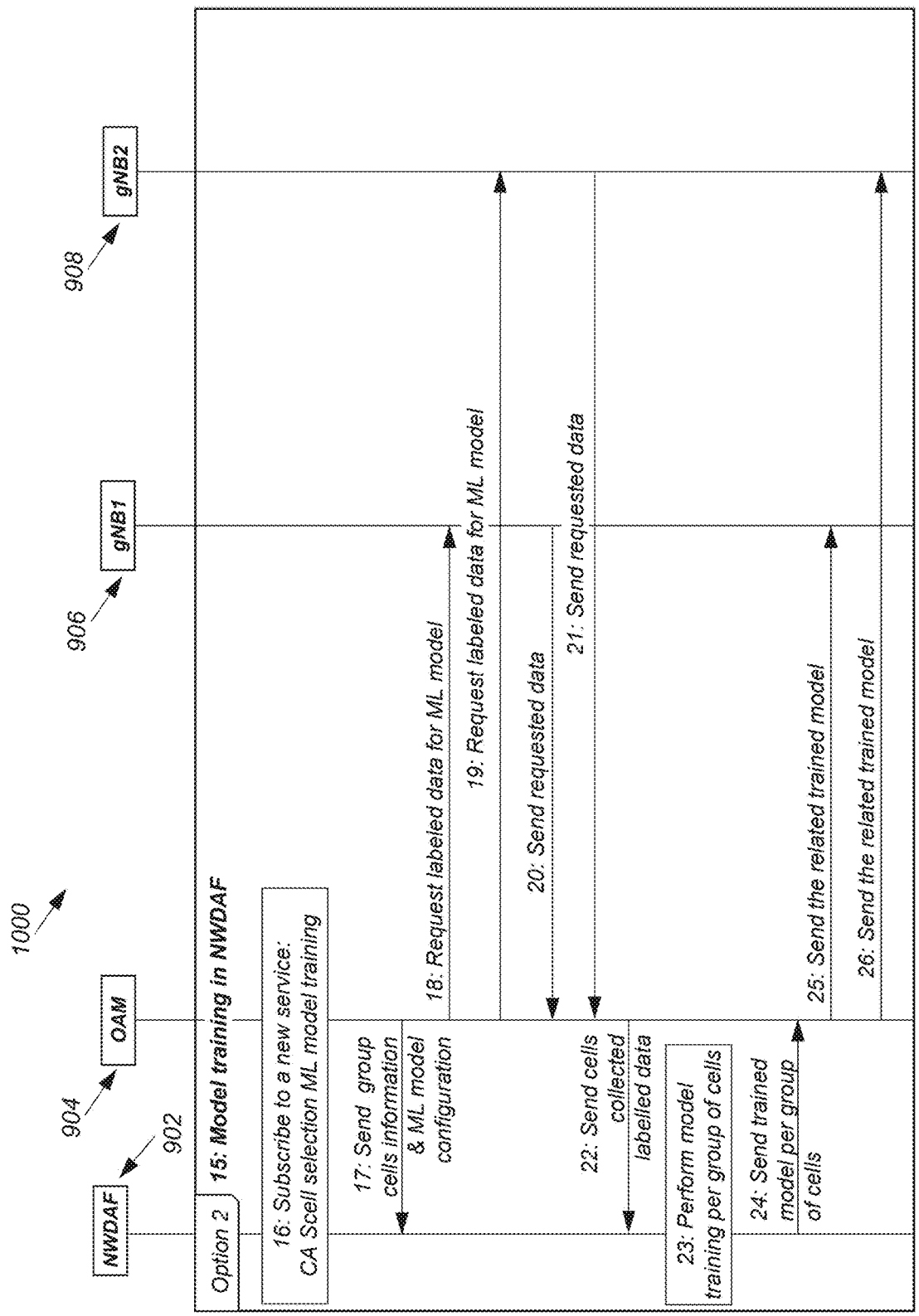
FIG. 10 shows, by way of example, a signalling procedure for 5G network data analytics function embedded training.

As shown in FIG. 10 the model training is realized outside of a network node 906, 908. In this case, OAM 904 can request the NWDAF 902 to perform the selected model training. At step 16 the NWDAF 902 and OAM 904 each subscribe to a new service to permit the CA Scell selection ML model training at the NWDAF 902. At step 17, the OAM 904 send group cell information and a ML model configuration to the NWDAF 902. At steps 18 and 19, the OAM 902 send a request for labelled data from network nodes 906, 908 of the cells in the formed group and receives this information from the network nodes 906, 908 at steps 20 and 21. At step 22, the OAM 904 shares this information with the NWDAF 902. Once received the NWDAF 902 can perform the model training per group at step 23 and share the trained models with OAM 904 at step 24. Thereafter, OAM 904 can send the appropriate trained model to each network node 906, 908.

Cell Grouping Method

The first operation 601 of FIG. 6 and the first operation 701 of FIG. 7 includes selecting a first group of cells. Selecting the first group of cells includes cell grouping.

Cell 'grouping' may comprise considering each CA relation for each cell. The OAM 904 can do the grouping and provide an identification to group multiple cells in a same site. As such data from all these cells are trained to provide a single model enabling greater accuracy. Steps involved in grouping cells belonging to the same site/group using CA relation may be as follows:
1. Consider each CA relation as an undirected edge of a graph. Vertices of the graph represent cells.
2. Find the connected components of a graph
3. Vertices (cells) belonging to the connected component of the graph belong to the same group.

Figure 11:
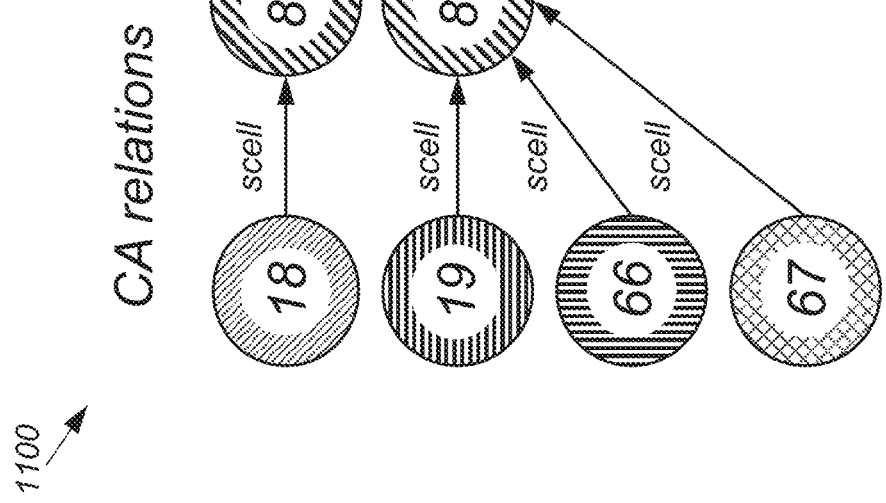
FIG. 11 shows, by way of example, a cell grouping procedure.

FIG. 11 below illustrates pictorially an example cell grouping procedure 1100 and identifies the cells in a group.

Example Apparatus

FIG. 12 shows, by way of example, a block diagram of an apparatus capable of performing the method(s) as disclosed herein. Illustrated is device 1200, which may comprise, for example, a mobile communication device such as UE 100 of FIG. 1. Comprised in device 1200 is processor 1210, which may comprise, for example, a single- or multi-core processor wherein a single-core processor comprises one processing core and a multi-core processor comprises more than one processing core. Processor 1210 may comprise, in general, a control device. Processor 1210 may comprise more than one processor. Processor 1210 may be a control device. A processing core may comprise, for example, a Cortex-A8 processing core manufactured by ARM Holdings or a Steamroller processing core designed by Advanced Micro Devices Corporation. Processor 1210 may comprise at least one Qualcomm Snapdragon and/or Intel Atom processor. Processor 1210 may comprise at least one application-specific integrated circuit, ASIC. Processor 1210 may comprise at least one field-programmable gate array, FPGA. Processor 1210 may be means for performing method steps in device 1200. Processor 1210 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more of all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or a network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 1200 may comprise memory 1220. Memory 1220 may comprise random-access memory and/or permanent memory. Memory 1220 may comprise at least one RAM chip. Memory 1220 may comprise solid-state, magnetic, optical and/or holographic memory, for example. Memory 1220 may be at least in part accessible to processor 1210. Memory 1220 may be at least in part comprised in processor 1210. Memory 1220 may be means for storing information. Memory 1220 may comprise computer instructions that processor 1210 is configured to execute. When computer instructions configured to cause processor 1210 to perform certain actions are stored in memory 1220, and device 1200 overall is configured to run under the direction of processor 1210 using computer instructions from memory 1220, processor 1210 and/or its at least one processing core may be considered to be configured to perform said certain actions. Memory 1220 may be at least in part external to device 1200 but accessible to device 1200.

Device 1200 may comprise a transmitter 1230. Device 1200 may comprise a receiver 1240. Transmitter 1230 and receiver 1240 may be configured to transmit and receive, respectively, information in accordance with at least one cellular or non-cellular standard. Transmitter 1230 may comprise more than one transmitter. Receiver 1240 may comprise more than one receiver. Transmitter 1230 and/or receiver 1240 may be configured to operate in accordance with global system for mobile communication, GSM, wideband code division multiple access, WCDMA, 5G, long term evolution, LTE, IS-125, wireless local area network, WLAN, Ethernet and/or worldwide interoperability for microwave access, WiMAX, standards, for example.

Device 1200 may comprise a near-field communication, NFC, transceiver 1250. NFC transceiver 1250 may support at least one NFC technology, such as NFC, Bluetooth, Wibree or similar technologies.

Device 1200 may comprise user interface, UI, 1260. UI 1260 may comprise at least one of a display, a keyboard, a touchscreen, a vibrator arranged to signal to a user by causing device 1200 to vibrate, a speaker and a microphone. A user may be able to operate device 1200 via UI 1260, for example to accept incoming telephone calls, to originate telephone calls or video calls, to browse the Internet, to manage digital files stored in memory 1220 or on a cloud accessible via transmitter 1230 and receiver 1240, or via NFC transceiver 1250, and/or to play games.

Device 1200 may comprise or be arranged to accept a user identity module 1270. User identity module 1270 may comprise, for example, a subscriber identity module, SIM, card installable in device 1200. A user identity module 1270 may comprise information identifying a subscription of a user of device 1200. A user identity module 1270 may comprise cryptographic information usable to verify the identity of a user of device 1200 and/or to facilitate encryption of communicated information and billing of the user of device 1200 for communication effected via device 1200.

Processor 1210 may be furnished with a transmitter arranged to output information from processor 1210, via electrical leads internal to device 1200, to other devices comprised in device 1200. Such a transmitter may comprise a serial bus transmitter arranged to, for example, output information via at least one electrical lead to memory 1220 for storage therein. Alternatively to a serial bus, the transmitter may comprise a parallel bus transmitter. Likewise processor 1210 may comprise a receiver arranged to receive information in processor 1210, via electrical leads internal to device 1200, from other devices comprised in device 1200. Such a receiver may comprise a serial bus receiver arranged to, for example, receive information via at least one electrical lead from receiver 1240 for processing in processor 1210. Alternatively to a serial bus, the receiver may comprise a parallel bus receiver.

Processor 1210, memory 1220, transmitter 1230, receiver 1240, NFC transceiver 1250, UI 1260 and/or user identity module 1270 may be interconnected by electrical leads internal to device 1200 in a multitude of different ways. For example, each of the aforementioned devices may be separately connected to a master bus internal to device 1200, to allow for the devices to exchange information. However, as the skilled person will appreciate, this is only one example and depending on the embodiment various ways of interconnecting at least two of the aforementioned devices may be selected.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. A network node of a wireless communication system, comprising:
   a processor and memory storing instructions which, when executed by the processor, cause the network node to:
   select a first group of cells, wherein each cell of the first group of cells is a secondary cell, SCell, for carrier aggregation, CA, on a user equipment, UE, of the wireless communication system and wherein the first group of cells are grouped based on CA relationships between each cell of the first group of cells;
   obtain a first set of labelled data for the first group of cells, wherein the labelled data comprises performance information regarding the first group of cells;
   train a machine learning model for the first group of cells using the first set of labelled data, wherein the machine learning model is configured to be implemented for SCell selection on the network node of the wireless communication system;
   determine whether the machine learning model meets a performance criteria for at least one cell of the first group of cells.

2. The network node of claim 1, wherein the means for determining whether the machine learning model meets the performance criteria for at least one cell of the first group of cells comprises:
   implementing the machine learning model on at least a first cell of the first group of cells to determine a performance value for the first cell;
   determining whether the performance value meets or does not meet a threshold value for the performance criteria.

3. The network node of claim 2, wherein the instructions, when executed by the processor, further cause the network node to:
   upon determining that the performance value meets the threshold value for the at least first cell, implement the machine learning model for SCell selection on the network node of the wireless communication system and/or send the machine learning model to a further network node for implementation.

4. The network node of claim 2, wherein the instructions, when executed by the processor, further cause the network node to:
   upon determining that the performance value does not meet the threshold value for the at least first cell, perform a fine tuning training process to the machine learning model for the at least first cell.

5. The network node of claim 4, wherein the fine tuning process comprises:
   obtaining local set of labelled data for the at least first cell;
   performing further training of the machine learning model for the at least first cell using the local set of labelled data;
   obtaining, from the further training of the machine learning model, a refined machine learning model for the at least first cell.

6. The network node of claim 5, wherein the instructions, when executed by the processor, further cause the network node to:
   implement the refined machine learning model for SCell selection, for the at least first cell of the first group of cells, on the network node of the wireless communication system and/or send the refined machine learning model to a further network node for implementation.

7. The network node of claim 1, wherein obtaining the first set of labelled data for the first group of cells comprises:
   receiving the first set of labelled data from a further network node.

8. The network node of claim 1, wherein the first set of labelled data and/or a local set of labelled data comprises at least one of the following:
   a primary cell spectral efficiency;
   a primary cell path loss;
   a primary carrier load;
   a secondary carrier load;
   an angle of arrival or departure of at least one reference signal.

9. The network node of claim 1, wherein the selecting the first group of cells, comprises:
   receiving, a request to perform training of the first group of cells, wherein the request comprises notification of the identity of the first group of cells.

10. The network node of claim 1, wherein the request is received from an operation and maintenance module, OAM, or a further network node.

11. An apparatus for a wireless communication system, comprising:
    a processor and memory storing instructions which, when executed by the processor, cause the apparatus to:
    select a first group of cells, wherein each cell of the first group of cells is a secondary cell, SCell, for carrier aggregation, CA, on a user equipment, UE, of the wireless communication system and wherein the first group of cells are grouped based on CA relationships between each cell of the first group of cells;
    obtain a first set of labelled data for the first group of cells, wherein the labelled data comprises performance information regarding the first group of cells;
    train a machine learning model for the first group of cells using the first set of labelled data, wherein the machine learning model is configured to be implemented for SCell selection on a network node of the wireless communication system;
    transmit, to the network node, the machine learning model.

12. The apparatus of claim 11, wherein the apparatus comprises a 5G network data analytics function, NWDAF.

13. The apparatus of claim 11, wherein:
    the selecting the first group of cells, comprises receiving, a request, from an operation and maintenance module, OAM, to perform training of the first group of cells; and/or the obtaining a first set of labelled data for the first group of cells, comprises receiving the first set of labelled data from the OAM; and/or the transmitting, to the network node, the machine learning model, comprises transmitting the machine learning model to the OAM, wherein the OAM is configured to redistribute the machine learning model to the network node.

14. The apparatus of claim 13, wherein the instructions, when executed by the processor, further cause the apparatus to:

receive a notification that further training of the machine learning model is required;

obtain local labelled data for at least a first cell of the first group of cells;

perform further training of the machine learning model for the at least first cell using the local labelled data;

obtain, from the further training of the machine learning model, a refined machine learning model for the first cell of the first group of cells.

15. The apparatus of claim 11, wherein the first set of labelled data and/or local labelled data comprises at least one of the following:

a primary cell spectral efficiency;

a primary cell path loss;

a primary carrier load;

a secondary carrier load;

an angle of arrival or departure of at least one reference signal.

16. A method, comprising:

selecting a first group of cells, wherein each cell of the first group of cells is a secondary cell, SCell, for carrier aggregation, CA, on a user equipment, UE, of a wireless communication system and wherein the first group of cells are grouped based on CA relationships between each cell of the first group of cells;

obtaining a first set of labelled data for the first group of cells, wherein the labelled data comprises performance information regarding the first group of cells;

training a machine learning model for the first group of cells using the first set of labelled data, wherein the machine learning model is configured to be implemented for SCell selection on a network node of the wireless communication system;

transmitting, to the network node, the machine learning model.

* * * * *